United States Patent
Antoun

(10) Patent No.: US 9,687,760 B2
(45) Date of Patent: Jun. 27, 2017

(54) SEPARATION DEVICES, SYSTEMS AND METHODS FOR SEPARATION OF PARTICULATES FROM LIQUID

(71) Applicant: Gregory S. Antoun, Meadville, PA (US)

(72) Inventor: Gregory S. Antoun, Meadville, PA (US)

(*) Notice: Subject to any disclaimer, the term of this patent is extended or adjusted under 35 U.S.C. 154(b) by 594 days.

(21) Appl. No.: 13/887,944

(22) Filed: May 6, 2013

(65) Prior Publication Data
US 2014/0326684 A1    Nov. 6, 2014

(51) Int. Cl.
| B01D 21/24  | (2006.01) |
| B04C 5/13   | (2006.01) |
| B04C 5/103  | (2006.01) |
| B04C 5/14   | (2006.01) |
| B01D 21/26  | (2006.01) |
| B04C 9/00   | (2006.01) |
| B01D 21/00  | (2006.01) |

(52) U.S. Cl.
CPC ...... *B01D 21/2411* (2013.01); *B01D 21/0024* (2013.01); *B01D 21/267* (2013.01); *B04C 5/103* (2013.01); *B04C 5/13* (2013.01); *B04C 5/14* (2013.01); *B04C 9/00* (2013.01); *B04C 2009/007* (2013.01)

(58) Field of Classification Search
CPC .. B04C 5/13; B04C 5/14; B04C 5/103; B04C 5/181; B04C 9/00; B04C 2009/007; B01D 21/267; B01D 21/0018; B01D 21/0024; B01D 21/2411; B01D 21/26; B01D 21/265; B01D 2021/0078

USPC ....................................................... 210/512.3
See application file for complete search history.

(56) References Cited

U.S. PATENT DOCUMENTS

| 2,375,826 | A | * | 5/1945 | Scott | B04C 5/08 209/729 |
| 2,787,374 | A | * | 4/1957 | Krebs | B03B 5/34 209/210 |
| 2,846,024 | A | * | 8/1958 | Bremi | B04C 5/04 55/413 |
| 3,235,091 | A | * | 2/1966 | Doll | B04B 5/12 209/210 |
| 4,294,695 | A |   | 10/1981 | Smith | |

(Continued)

OTHER PUBLICATIONS

Definition of "generally", www.dictionary.com, Accessed Oct. 13, 2016, pp. 1-5.*

*Primary Examiner* — David C Mellon
(74) *Attorney, Agent, or Firm* — Bartony & Associates, LLC

(57) ABSTRACT

A system for separating a heavy fraction from a liquid includes an upper section in fluid connection with-an inlet, an impeller within the upper section and a flow restrictor positioned below the impeller having a diameter less than the diameter of a a lower section housing to form a gap between the flow restrictor and the lower section housing. An inlet of a conduit is positioned radially inward from an interior wall of the lower section housing and below the flow restrictor. The conduit includes an outlet outside of the lower section. The lower section is generally cylindrical from the top of the gap to a baffle positioned below the flow restrictor, which defines a settling section. The lower section further includes a slurry outlet in operative communication with the settling section.

33 Claims, 8 Drawing Sheets

(56) References Cited

U.S. PATENT DOCUMENTS

| | | |
|---|---|---|
| 4,364,831 A | 12/1982 | Burns |
| 5,330,641 A | 7/1994 | Cattani |
| 6,036,871 A | 3/2000 | Eichler |
| 7,520,997 B2 | 4/2009 | Antoun |
| 2006/0049120 A1* | 3/2006 | Antoun .................. B04C 5/103 210/787 |

* cited by examiner

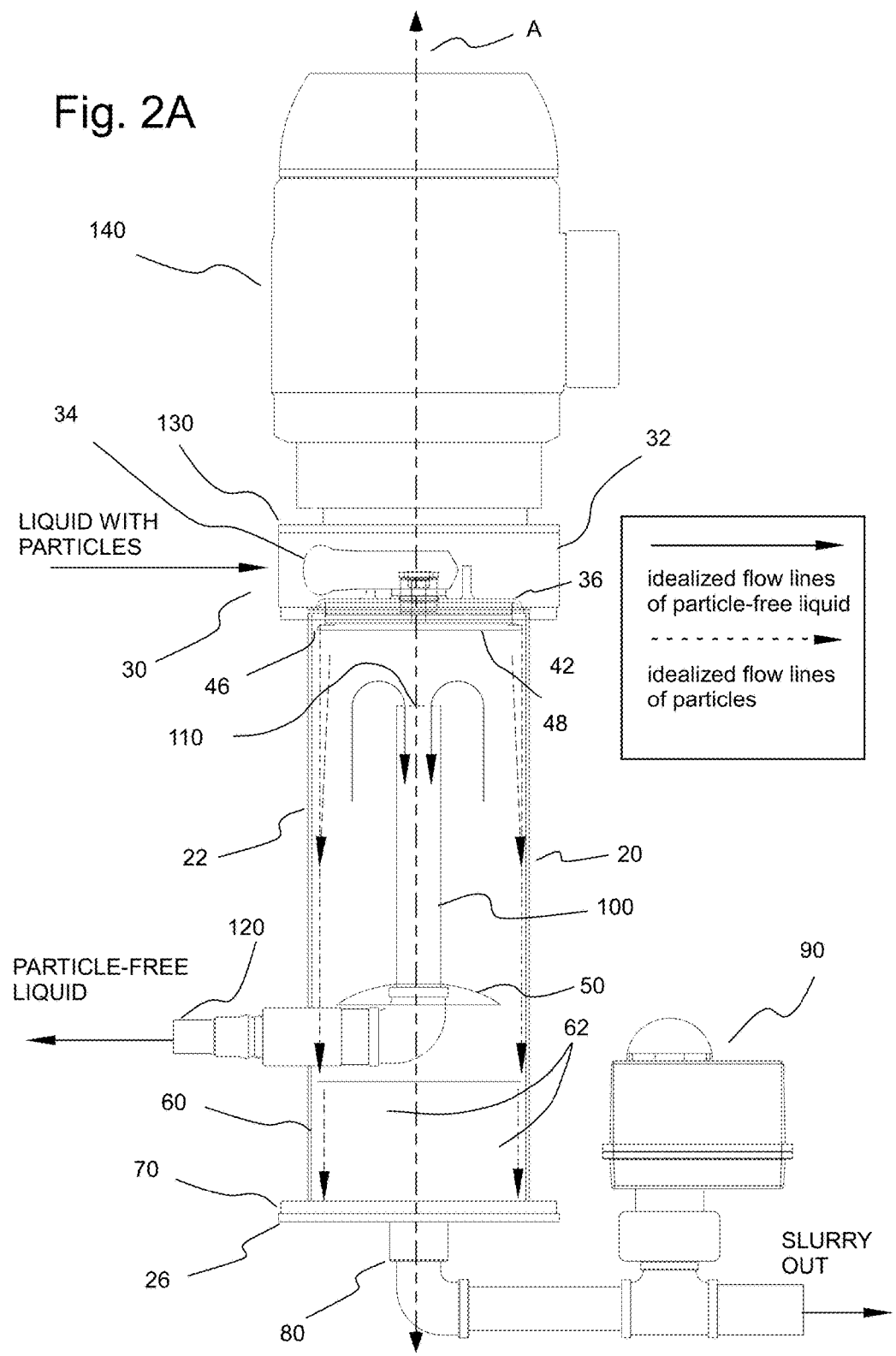

SEPARATION DEVICES, SYSTEMS AND METHODS FOR SEPARATION OF PARTICULATES FROM LIQUID

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosures of all references cited herein are incorporated by reference.

In a number of embodiments hereof, separation devices, systems and methods for separation of materials are based upon differences in densities in, for example, separation of solid particles from liquids.

In a number of situations arising in many settings, it is desirable to separate mixtures of materials of different density. For example, it is often desirable to remove particles from a liquid "contaminated" with such particles. For example, in the machining industry coolant liquid becomes contaminated with metal particles having a density generally greater than the liquid coolant.

Centrifugal force effects have been used to separate heavier fractions from lighter fractions in aqueous slurries. For example, U.S. Pat. No. 6,036,871 discloses a separation device in which a slurry is made to spin in a separation chamber under influence of a differential pressure. The differential pressure is generated using a pressure increasing stage including a transport rotor device operating in conjunction with a stator arrangement. The pressure increasing stage is in placed immediately upstream of an inlet of the slurry into the separation chamber. The separation chamber can include a cyclone rotor device. In one embodiment, the rotor blades of a cyclone rotor device and rotor blades of the transport rotor device are mounted on the same rotary shaft. The separating chamber of U.S. Pat. No. 6,036,871 includes a tubular cylindrical housing translating into a funnel-shaped bottom portion which tapers into a discharge opening at the lower end. The hollow rotary shaft protrudes coaxial to the longitudinal centerline of the separation chamber. The end or opening of the hollow rotary shaft is positioned at a distance suitably spaced away from the plane from which the funnel-shaped portion extends downwards. Heavier fractions are collected at an outlet at the bottom of the funnel shaped portion while lighter liquid fractions pass through an upper outlet in fluid connection with the opening of the hollow shaft.

U.S. Pat. No. 5,330,641 discloses a separator of solid particles for variable flow rates of discharge from a dental apparatus. The separator includes a container including an upper cylindrical zone having an inlet hole for the fluid to be separated. A rotor of a centrifugal pump rotates in the upper cylindrical zone, which initializes a separation of the particles by centrifugation. The separator further includes a truncoconical zone which functions as a cyclone and continues the separation of the solid particles.

Mechanical elevators or augers have also been used to convey solid particles from a liquid as disclosed, for example, in U.S. Pat. Nos. 4,294,695 and 4,364,831.

U.S. Pat. No. 7,520,997 discloses a separation system based upon density differences in which a pressurized fluid is delivered to the system inlet and rotational motion is imparted to the fluid (which may, for example, include a mixture of a liquid and solid particles). In the system of U.S. Pat. No. 7,520,997, a rotating shaft which imparts rotation motion to an impeller (to impart rotation motion to the fluid) is hollow and includes an opening via which liquid substantially free of solid particles exits the system. No fluid pressure or downward force is imparted to the fluid by the impeller vanes of U.S. Pat. No. 7,520,997.

Although a number of separation devices, systems and methods have been developed for separating materials based upon differences in densities (for example, separation of solid particles from liquids) it remains desirable to develop improved separation devices, systems and methods.

SUMMARY

In one aspect, a system for separating a heavy fraction from a liquid includes an upper section, an inlet in fluid connection with the upper section to introduce the liquid into the upper section, an impeller within the upper section to induce rotational flow and fluid pressure to the liquid within an upper section, an a flow restrictor positioned below the impeller. The flow restrictor has a diameter less than the inner diameter of a housing of a lower section so that a gap is formed between the flow restrictor and the housing of the lower section. The system further includes a conduit including an inlet positioned radially inward from an interior wall of the housing of the lower section and axially below the flow restrictor. The conduit further includes an outlet outside of the lower section via which the liquid with a reduced concentration of the heavy fraction exits the lower section (and the system). The lower section may, for example, be generally cylindrical from the top of the gap to a baffle positioned axially below the flow restrictor. The baffle defines a settling section for the heavy fraction. The lower section further includes a slurry outlet in operative communication with the settling section via which a slurry with an increased concentration of the heavy fraction exits the lower section. The system may further include a deflector positioned within the lower section axially above the baffle and below the flow restrictor. The deflector has a diameter less than the diameter of the interior wall of the housing of the lower section.

In a number of embodiments, the impeller includes radially extending vanes in operative connection with a rotating shaft. The flow restrictor may, for example, be a radially extending member or plate positioned below and rotating with the vanes of the impeller. The upper section may, for example, include a cavity within with the impeller rotates, wherein the dimensions of the cavity are slightly greater than the dimensions of the vanes (for example, so that there is no significant gap between the vanes and the cavity). The vanes (in cooperation with the cavity) may, for example, impart rotation and downward force to the liquid.

The baffle may, for example, include stationary vanes that extend radially outward generally to the inner diameter of the housing. In a number of embodiments, the deflector operates to prevent at least a portion of the heavier fraction in the settling area from passing from the settling section to the inlet of the (outlet) conduit. The deflector may, for example, operate to prevent at least a portion of liquid having a reduced concentration of heavy fraction from passing from a section of the housing radially inward from the interior wall of the housing into the settling section. In a number of embodiments, the deflector has a generally concave shape, and the concave deflector is oriented so that the center of the concave deflector is downward from a concave surface of the concave deflector.

In a number of embodiments, there is no rotational flow mechanism to induce rotational flow below the flow restrictor (that is, in the lower section). The heavier fraction comprises solid particles. The system may, for example, include no filter medium (such as screens, meshes, size exclusion systems, etc.). In a number of embodiments, the inlet of the conduit faces upward.

In a number of embodiments, a diameter of the cavity gradually increases in a curved shape in the axially downward direction until the diameter of the cavity is approximately the same as the inner diameter of the housing of the lower section. A diameter of the flow restrictor may, for example, gradually increase in a curved shape in the axially downward direction.

In another aspect, a system for separating a heavier fraction from a liquid includes an upper section; an inlet in fluid connection with the upper section to introduce the liquid into the upper section; a rotational flow mechanism positioned below the inlet in operative connection with the upper section to induce rotational flow and fluid pressure within the upper section; a lower section in fluid connection with the upper section; a flow restrictor positioned below the rotational flow mechanism, the flow restrictor having a diameter less than the inner diameter of a housing of the lower section so that a gap is formed between the flow restrictor and the housing of the lower section; a conduit positioned within the lower section, the conduit comprising an inlet positioned radially inward from an interior wall of the housing of the lower section and axially below the flow restrictor, the conduit further including an outlet outside of the lower section via which the liquid with a reduced concentration of the heavy fraction exits the lower section; at least one baffle positioned adjacent a bottom of the housing to reduce rotation in flow within the lower section in the area of the baffle, the baffle defining a settling section for the heavier fraction; and a slurry outlet in operative communication with the settling section via which a slurry with an increased concentration of the heavy fraction exits the lower section. The system may, for example, further include a deflector positioned above the baffle and below the inlet, the deflector having a diameter less than the diameter of the housing of the lower section.

The rotational flow mechanism may, for example, be an impeller including radially extending vanes in operative connection with a rotating shaft. The flow restrictor may, for example, be a radially extending member such as a plate below the impeller. The flow restrictor may, for example, rotate with the vanes of the impeller. In a number of embodiments, the upper section includes a cavity within with the impeller rotates, wherein the dimensions of the cavity are slightly greater than the dimensions of the vanes. The vanes may, for example, impart rotation and downward force to the liquid. The impeller may, for example, be in operative connection with a rotating shaft.

The baffle may, for example, include stationary vanes that extend radially outward generally to the inner diameter of the housing. An inner wall of the lower section may, for example, be generally cylindrical from at least the position of the top of the gap to the baffle.

In a number of embodiments, the deflector operates to prevent at least a portion of the heavier fraction in the settling area from passing from the settling section to the inlet of the outlet conduit. The deflector may, for example, operate to prevent at least a portion of liquid having a reduced concentration of heavy fraction from passing from a section of the housing radially inward from the interior wall of the housing into the settling section. In a number of embodiments, the deflector has a generally concave shape, and the concave deflector is oriented so that the center of the concave deflector is downward from a concave surface of the concave deflector.

In a number of embodiments, there is no rotational flow mechanism to induce rotational flow in the housing below the flow restrictor. The heavier fraction may, for example, include solid particles. The system may, for example, include no filter medium (such as screens, meshes, size exclusion systems, etc.). In a number of embodiments, the inlet of the conduit faces upward.

In a further aspect, a method of separating solid particles from a liquid includes introducing liquid containing particles into a separation system, the separation system comprising a housing; inducing rotational flow of the liquid containing particles and fluid pressure in an upper section of the housing; and forcing the liquid containing particles past a flow restrictor to a lower section of the housing, the flow restrictor having a diameter less than an interior wall of the housing so that a gap is formed between the flow restrictor and the interior wall of the housing through which the liquid containing particles must pass and so that the liquid containing particles moves around and downward along the interior wall of the housing, thereby forcing particles to move radially outward toward the interior wall of the housing as a result of centrifugal force.

In still a further aspect, a system for separating a heavier fraction from a liquid includes a housing; a rotational flow mechanism in operative connection with a section of the housing to induce rotational flow and fluid pressure within the housing, a flow restrictor positioned below the section of the housing wherein rotational flow mechanism induces rotational flow and fluid pressure, the flow restrictor having a diameter less than the inner diameter of the housing so that a gap is formed between the flow restrictor and the housing, the housing comprising an inlet positioned above the flow restrictor and a first outlet positioned below flow restrictor, the first outlet being positioned radially inward from an interior wall of the housing; a collection section adjacent the bottom of the housing for the heavier fraction, and the housing further including a second outlet positioned adjacent the bottom of the housing in fluid communication with the collection section.

The present devices, systems, and methods, along with the attributes and attendant advantages thereof, will best be appreciated and understood in view of the following detailed description taken in conjunction with the accompanying drawings.

BRIEF DESCRIPTION OF THE DRAWINGS

FIG. 2A illustrates a side, partially cutaway view of the separation device of FIG. 1A in an assembled state and showing idealized flow lines of particle-free liquid and idealized flow lines of particles.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a baffle" includes a plurality of such baffles and equivalents thereof known to those skilled in the art, and so forth, and reference to "the baffle" is a reference to one or more such baffles and equivalents thereof known to those skilled in the art, and so forth.

Figure 1A:
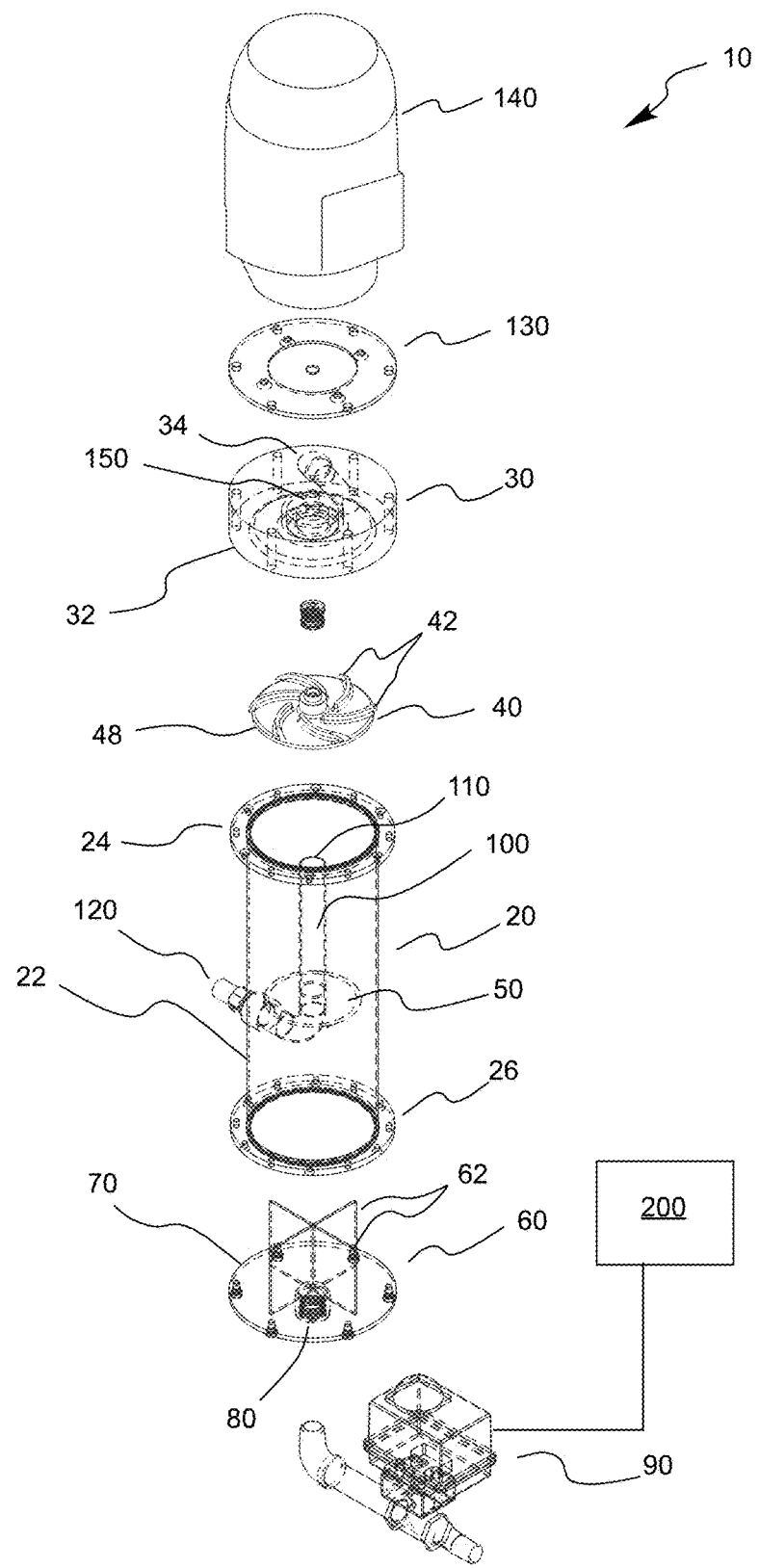
FIG. 1A illustrates a perspective, transparent or hidden line view an embodiment of a separation device hereof in a disassembled or exploded view.
Figure 1B:
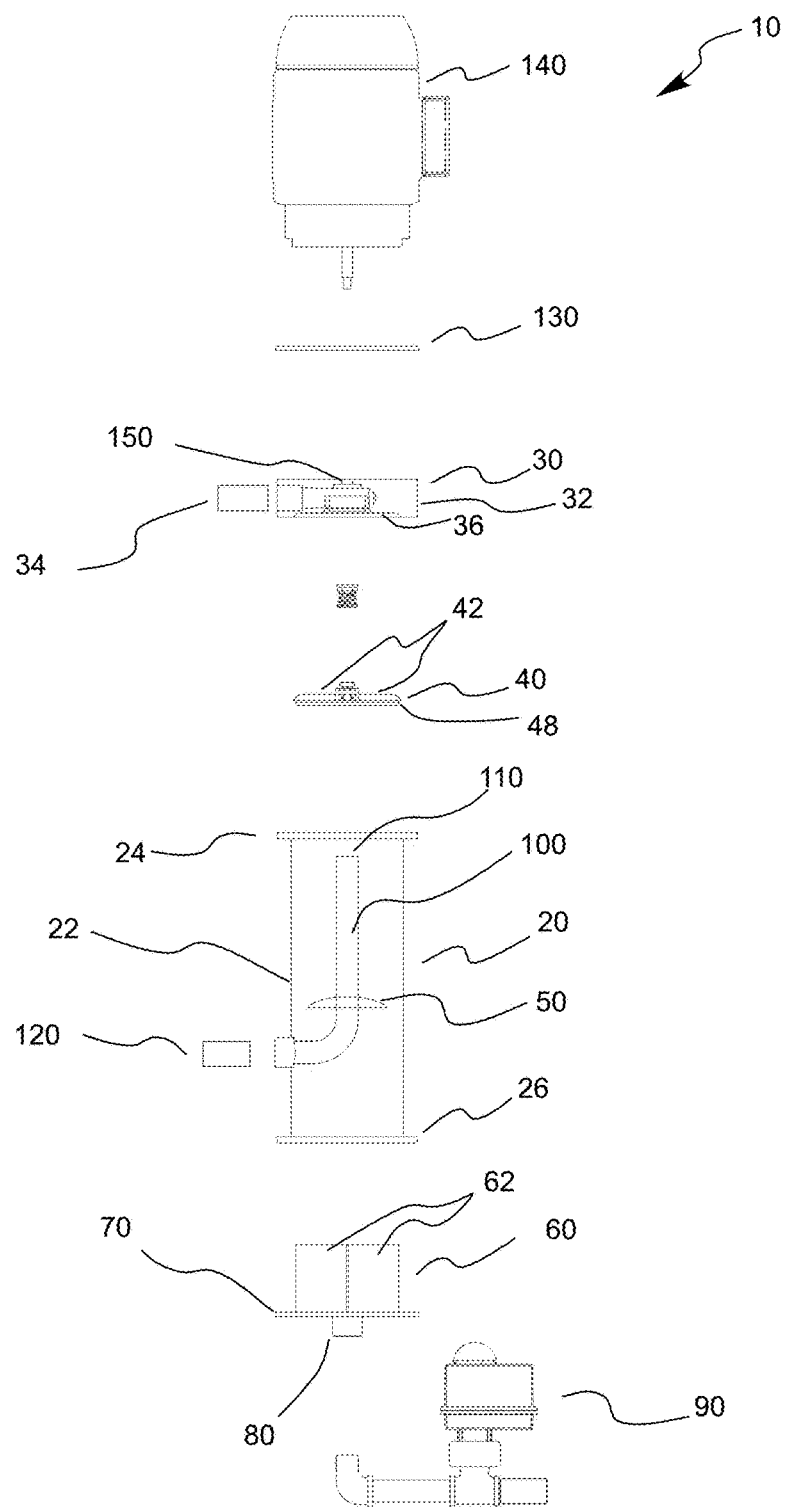
FIG. 1B illustrates a side view the separation device of FIG. 1A in a disassembled or exploded view.
Figure 1C:
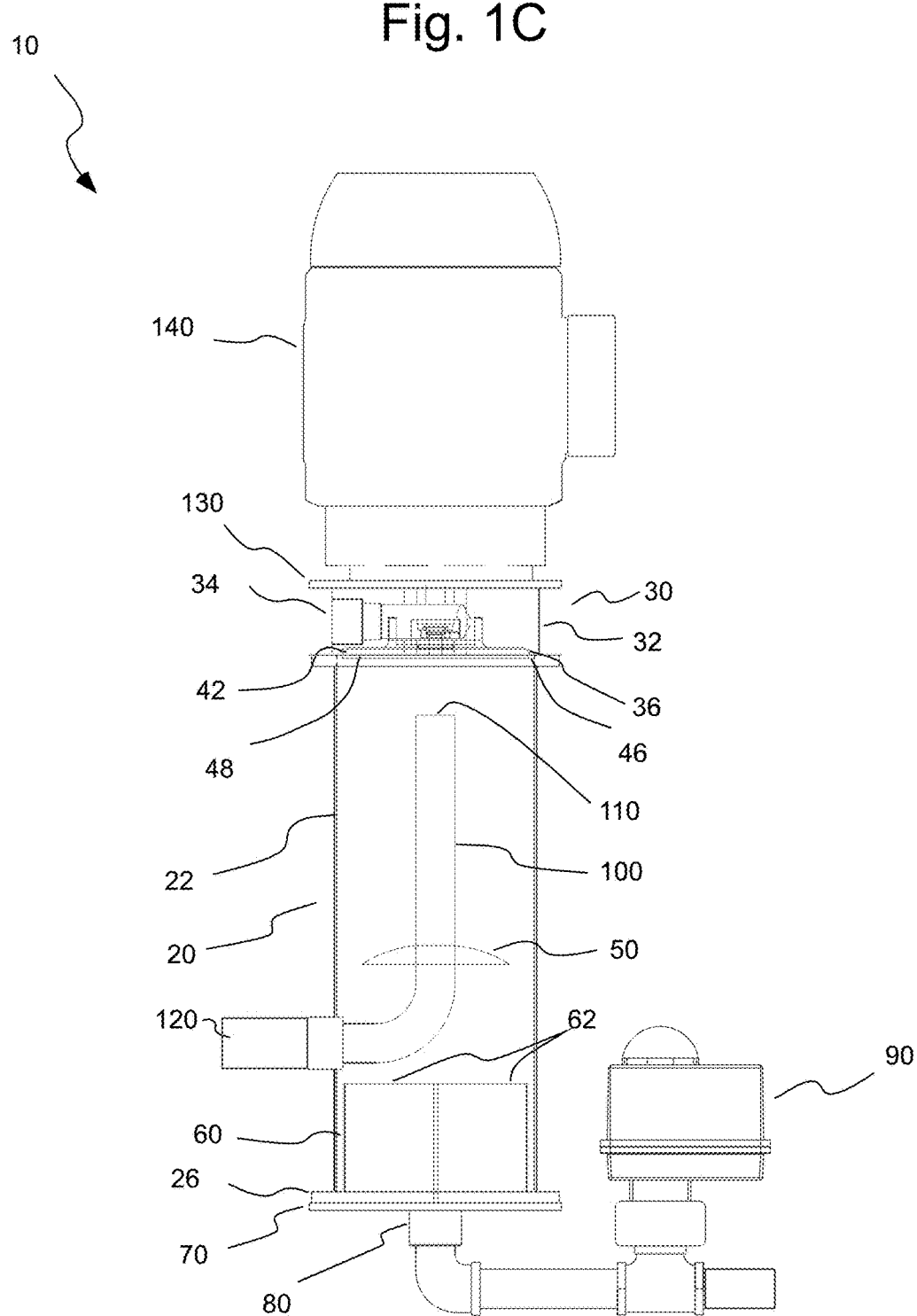
FIG. 1C illustrates a side, transparent or hidden line view of the separation device of FIG. 1A in an assembled state.
Figure 1D:
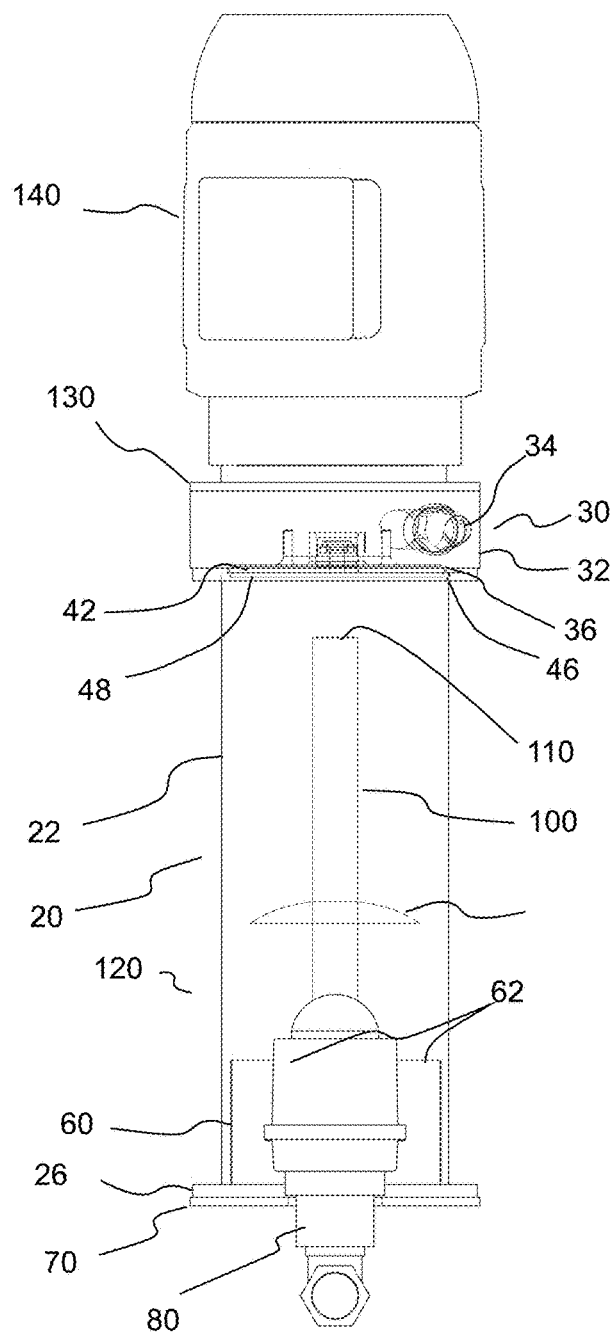
FIG. 1D illustrates another side, transparent or hidden line view of the separation device of device of FIG. 1A in an assembled state.
Figure 1E:
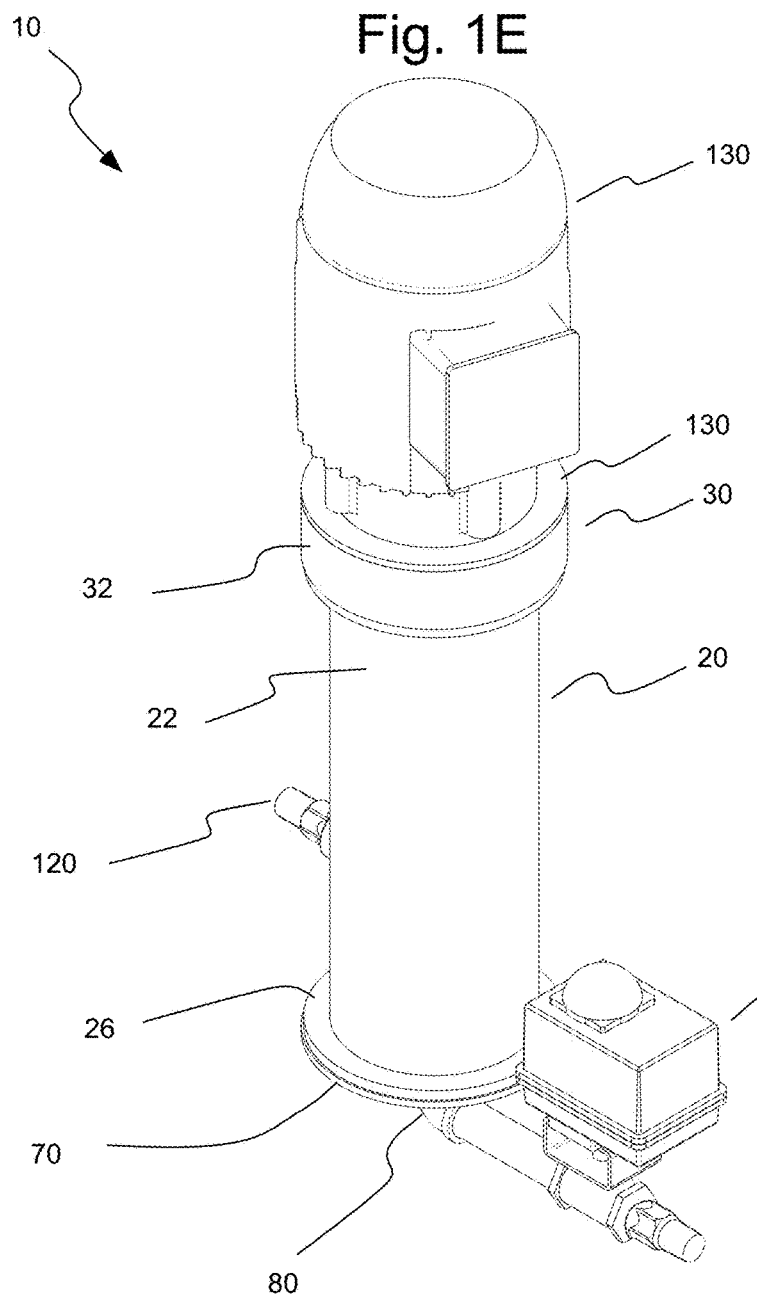
FIG. 1E illustrates a perspective view of the separation device of FIG. 1A in an assembled state.
Figure 1F:
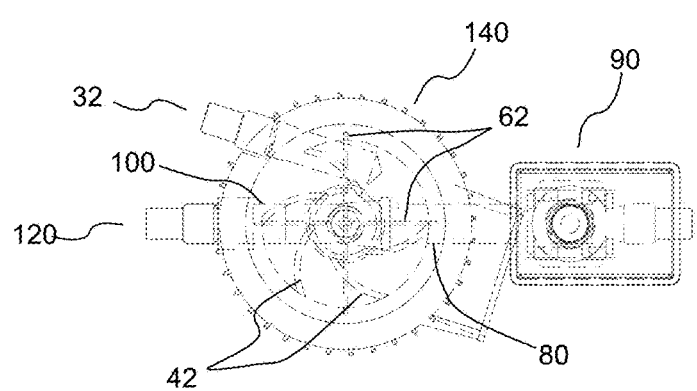
FIG. 1F illustrates a top, transparent or hidden line view of the separation device of FIG. 1A in an assembled state
Figure 2B:
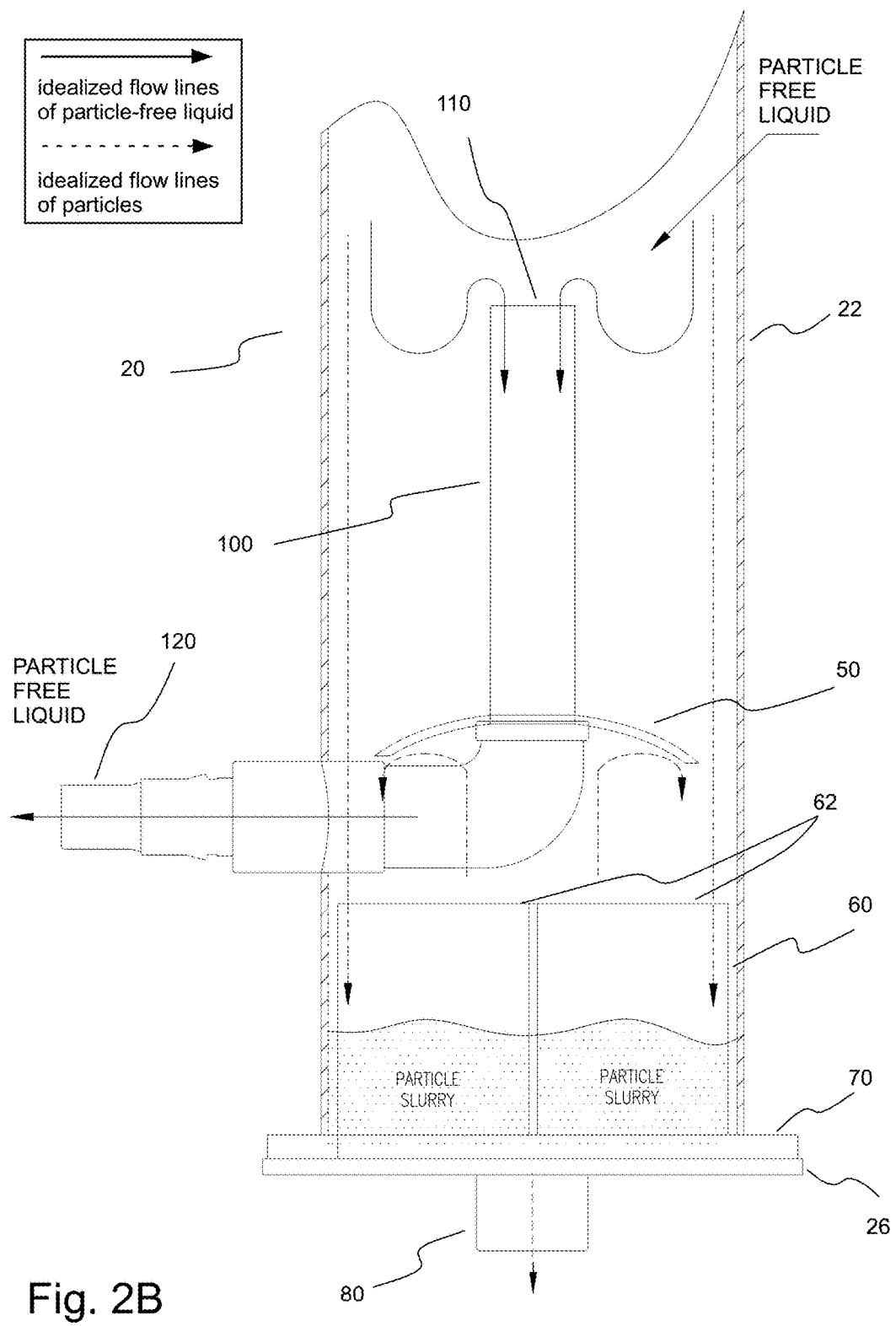
FIG. 2B illustrates a side, partially cutaway view of a portion of the separation device of FIG. 1A and showing idealized flow lines of particle-free liquid and idealized flow lines of particles.
Figure 3:
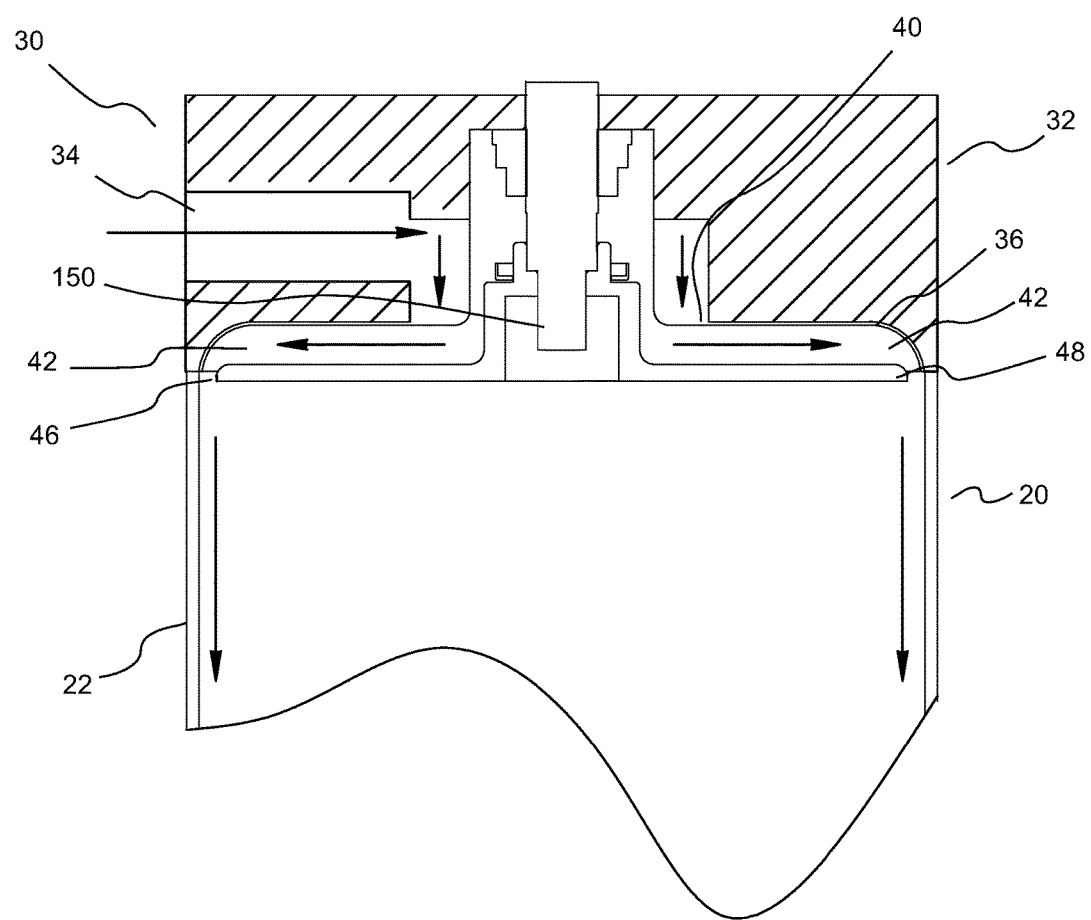
FIG. 3 illustrates a side, cross-sectional view of the impeller of the separation device of FIG. 1A and the flow of fluid therethrough.

As used herein terms such as "upward", downward and the like refer to the orientation of the systems hereof in FIGS. 1A through 3. In a number of embodiments, such systems are oriented generally vertically such that gravity assists in separation. As used herein, the term "vertical" is defined as the direction aligned with the direction of the force of gravity (for example, as evidenced by a plumb line). Further, an element is "horizontal" at a given point if it is perpendicular to the gradient of the gravity field at that point.

In a number of embodiments, a separator system is described that takes advantage of centrifugal force to separate materials based upon differences in density. In a representative embodiment hereof, solid particles are removed from a liquid (for example, a coolant liquid used in machining operations) having a density less than the particles. In a number of embodiments, the separation system includes no filtering media such as screens, meshes, etc. The separation systems hereof separate substantially particle-free liquid from a slurry including liquid with a high concentration of particles. In another stage, system or process, the particles can be removed from the slurry by a "settling" separator system. The systems hereof are relatively simple to manufacture and to operate. The systems hereof are also more efficient when compared to currently available separation systems.

FIGS. 1A through 3 illustrate an embodiment of a separation system 10 that may, for example, be used in separating metal particles from coolant liquid used in machining processes, but the separation systems hereof may be used in many other separations. In separation system 10 of FIGS. 1A through 3, "dirty" coolant or other liquid (that is, liquid including a heavy fraction such as metal particles) enters a lower section or separation chamber 20 formed by a lower section housing or chamber housing 22 via a partially enclosed upper section or impeller section 30 (see, for example, FIG. 3). Upper section 30 includes an upper section housing 32 with an inlet 34, which may, for example, be oriented at a generally tangential angle with respect to generally cylindrical uppers section 30. The liquid including particles passing through inlet 34 is pressurized within upper section 30 and is caused to flow in a generally circular motion about the axis of upper section 30 in the direction of the rotation of an impeller 40. Impeller 40 is positioned below inlet 34 (see, for example, FIG. 3). There is no need to pressurize the fluid to the system pressure before it enters system 10.

As used herein, the term "impeller" refers generally to any mechanism that imparts a rotational or circular flow and fluid pressure to fluid within upper section 30. Impeller 40 rotates at a speed determined by the application. To optimize performance, the speed may be adjusted for different particle size and density using, for example, an adjustable frequency drive. The rotational speed of impeller 40 in several embodiments may, for example, be typically varied between 1000 rpm and 3500 rpm. In the illustrated embodiment, upper section 30, which is closed on the top and includes a lower cavity 36 (see, for example, FIG. 3) formed generally to the shape and dimension of vanes 42 of impeller 40 (but of slightly larger dimension the vanes 42), is attached at its upper end (in the illustrated orientation) thereof to a motor mount 130 via connectors such as bolts and cooperating nuts (not shown). A motor 140 is also attached to motor mount 130 which connects to and imparts rotational motion to a shaft 150. Impeller vanes 42 are connected to shaft 150 and rotate therewith. No fluid flows through shaft 150, and shaft 150 need not be hollow or have any passages formed therein.

Upper section 30 is connected to housing 22 of lower section 20 via an upper flange 24 of lower section housing 22. In the illustrated embodiment, bolts connecting motor mount 130 to upper section 30 pass through seatings in housing 32 of upper section 30 and through openings formed in upper flange 24. Upper section 20 and lower section 30 may, alternatively, be formed as two sections of a generally integral or monolithic housing. Housing 22 of lower section 20 also includes a lower flange 26 which connects to a base 70 (for example, via connectors such as bolts and cooperating nuts) to form the bottom enclosure of lower section housing 22. An outlet 80 for sludge/slurry including a high concentration of particles removed from the liquid may, for example, be formed in sealing base 70.

As discussed above, rotation of impeller 40 causes the fluid to rotate or spin and creates fluid pressure. As vanes 42 rotate, fluid is displaced and centrifugal force imparted thereto with little or no blowback between vanes 42 and impeller cavity 36. A positive pressure is created on the outlet side of impeller 40 and a negative/suction pressure is created on the inlet side of impeller 40. In the embodiment of FIGS. 1A through 3, vanes 42 of impeller 40 are connected to a lower, solid plate (which forms a lower section of impeller section 30). Lower plate or flange 48 extends radially to a diameter slightly less than the diameter of an inner wall of housing 22 of lower section 20 and operates as the outlet from upper section 30. In that regard, a gap 46 is formed between plate 48 and the interior wall of housing 22 of lower section 20 which places upper section 30 in fluid connection with lower section 20.

The fluid within the enclosure of upper section 30 is forced to flow downward through gap 46 formed by the outside edges lower plate 48 (which thus acts as a flow restrictor) and the interior wall of housing 22 of lower section 20. In other words, the particulate containing liquid must pass down the interior wall of housing 22 of lower section 20 through gap 46, which is preferably relatively narrow compared to the diameter of impeller 40. In a number of representative embodiments hereof, impeller vanes 42 and lower plate 48 were operably connected and lower plate 48 had a diameter of approximately 8.5 inches. Gap 46 was approximately 0.125 inches (⅛ inch) in width in this embodiment. However, the gap width may be varied depending, for example, on the flow rate, the size of the impeller and speed of impeller 40. The rotation of impeller 40 forces the relatively dense particles to the interior walls of lower section or chamber 20.

The pressure generated by impeller 40 is sufficient to overcome any resistance in the system. In several embodiments of systems hereof, the pressure was at least 20 psi. Any change that increases resistance to flow (for example, an increase in liquid viscosity, a reduction in the width of gap 46 or an increase in the length of gap 46) would require an increase of pressure. The inlet flow is an important parameter in determining the width of gap 46. The total open area of gap 46 must accommodate the required liquid flow through the device. In that regard, the greater the flow rate, the greater the area required to maintain a generally laminar flow. Although, the width of gap 46 can be increased to provide an increase in flow area, filtration efficiency may suffer. Optimization of inlet flow, gap width, impeller speed etc. is readily accomplished by those skilled in the art using well-known engineering principles applicable to system 10.

As discussed above, the width of gap 46 controls the velocity of the liquid down the interior wall of housing 22 of lower section 20. For example, a width of 0.125 inches for gap 46 and an interior wall diameter of 8.5 inches for housing 20 provide approximately 3.33 square inches of area through which the liquid/particles can pass. For a flow rate of 30 gallons: 30 gallons/minute×231 cubic inches/gallon=6930 cubic inches of liquid pass through gap 46 per minute. This results in a speed of 173 feet/minute or approximately 2.9 feet/second. In the case of filtering metal cutting particles from a liquid coolant, for example, a flow speed in the range of approximately 100 to 200 feet per minute may result in optimal performance. Such metal cuttings can have a density of approximately 4 gram/cubic centimeter. The optimal liquid speed through gap 46, the speed of rotation of impeller 40 and the inner diameter of lower section housing 22 are also determined, in part, by the density of the particles that are being removed. If tungsten, having a density of 19 grams per cubic centimeter, is the particle to be removed, a slower speed will suffice to remove the same size particles. If the fluid in question can contain different contaminants at different times, the speed may be adjusted for optimum efficiency. Once again, such adjustments are well within the skill of one of ordinary skill in the art.

Although the flow restrictor plate 48 and impeller vanes 42 are operably connected and rotate together in the embodiment of FIG. 1A through 3, they may be separated. In that regard, impeller vanes 42 and/or another mechanism of imparting rotational flow may be positioned above flow restrictor plate 48. Flow restrictor plate 48 can be stationary or rotate. Moreover, vanes 42 may have a diameter equal to, less than or greater to the diameter of flow restriction plate 48.

As the fluid passes through gap 46 and enters lower section 20, it continues to spin, and the centrifugal force causes more and smaller particles to be held by the centrifugal force on the interior wall of chamber housing 20. The more the liquid spins, the more the particles move radially outward to the interior wall of chamber housing 20 and are held there.

Upper section 30 and lower section 20 are divided by flow restrictor plate 48, which, in the embodiment of FIGS. 1A through 3, is attached to the lower edge of vanes 42 of impeller 40. Preferably, flow patterns within lower section 20 minimize or prevent flow of particles radially inward toward, the centerline or axis A of lower section 20 (see, for example, FIG. 2A). In that regard, unlike many centrifugal separation systems, lower section (in which both an outlet for "clean liquid" and an outlet for the heavy fraction/particles are positioned) does not include a rotational flow mechanism for inducing rotational flow (for example, a rotor or impeller) which can result in complicated, turbulent and/or chaotic flow patterns leading to flow of some particles radially inward. Vanes 42 of impeller 40 are separated from lower section 20 by flow restriction plate 48. Likewise, the shape of the inner wall of housing 22 of lower section 20 is generally cylindrical, whereas many currently available centrifugal/cyclone separation systems include a conical or frustoconical region which terminates in a lower outlet for a heavier fraction. A conical or frustoconical region, wherein radius decreases as fluid travels downward, can lead to undesirable radial inward and upward flow of particles/heavier fraction.

In many currently available separation systems based at least in part on centrifugal forces, the inertia imparted to the heavy fraction or pressure changes within the system are typically the only method of separation. In separation system 10, flow restriction plate 48 is solid and does not allow the passage of liquid/particles. Because the liquid/particles must pass through and only through gap 46 (between flow restriction plate 48 and the interior wall of lower section housing 22), the particles are mechanically forced to the interior wall of housing 22 of lower section 20 while flowing in a generally circular pattern or spiraling downward pattern. Efficiency of separation is thereby increased as compared to many currently available systems. Relatively efficient separations may be achieved using separation chambers (lower sections) of relatively short length in the separation systems hereof.

The inertia of the particles causes the particles to continue down the sides of the housing 22 of lower section 20 past a deflector 50 positioned within lower section 20. Rotation of particles about the interior wall of lower section housing 22 is reduced or preferably stopped via a mechanical stop mechanism or baffle 60 positioned below deflector 50. A slurry or sludge including a high concentration of particles collects (see, for example, FIG. 2B) in sludge settling baffle 60, which is positioned adjacent a bottom or base sealing plate 70 of lower section housing 22. In the embodiment of FIGS. 1A through 3, baffle 60 includes stationary, crossing vanes 62 which stop the rotation of the flow about the interior wall of lower section housing 22. In one embodiment, at a programmable interval a solenoid valve 90 in fluid connection with outlet 80 at the bottom of the separation system 10 is opened for a programmable length of time. The interval and open time of solenoid valve 90 may, for example, be controlled by a controller 200 (illustrated schematically in FIG. 1A) such as a programmable logic controller (PLC) or other type of computer/processor. As the liquid within lower section 20 is under pressure, the collected particles and some liquid flowed out of chamber housing 20 through outlet 80 and through valve 90 as a slurry upon opening of valve 90. The slurry can flow to an inlet of a sludge separator system.

As the liquid travels downward within lower section 22, the liquid reaches deflector 50 and is caused generally to flow up and to the center or axis A of lower section housing 22 by the pressurized flow within lower section 20. Relatively particle-free liquid exits lower section 20, through "clean" liquid conduit or outlet conduit 100. In general, the direction of flow of the relatively dense particles is not reversed and continues downward to baffle 60 as described above. Deflector 50 has a diameter smaller than the inner diameter of lower section housing 22 and does not substantially affect the flow of particles along the interior wall of lower section housing 22. An idealized flow path illustrating the separation is represented by arrows in FIG. 2A through FIG. 3. Liquid inward from the interior wall of lower section housing 22 (the flow of which is represented by solid lines in FIG. 2A through FIG. 3), which is relatively free of particles, flows to the centerline or axis A (see FIG. 3). An inlet 110 of clean liquid conduit 100 is positioned generally in the center of lower section 20 (as, for example, defined by axis A) and is well above baffle 60. In the illustrates embodiment, liquid conduit 100 passes downward through lower section 20 and exits lower section housing 22. Clean liquid exits system 10 via an outlet 120 of liquid conduit 100. In the illustrated embodiment, liquid conduit 100 extends downward within lower section 20 and passes through an opening in deflector 50 to provide support for deflector 50 within lower section 20.

Absent deflector 50, the flow of liquid within chamber housing 20 may undesirably cause particles to flow radially inward and upward to inlet 110 of liquid conduit 100. In that regard, at an inlet flow rate of particle-laden fluid of approximately 30 gallons/minute, a downward flow rate of approximately 2.9 feet/sec may result through gap 46 having a width of 0.125 inches as described above. Without limitation to any mechanisms, complicated, non-laminar flow in lower section 20, which may occur with such relatively high flow rates and may lead to undesirable radially inward and/or upward flow of particles, is preferably reduce or avoided. Deflector 50 assists in ensuring that relatively particle-free liquid flow inward and upward to inlet 110 of liquid conduit 100 while preventing particles from flow upward from baffle 60. As illustrated, for example, in FIG. 2B a curved or concave deflector having its center or focus oriented downward (toward particle/sludge outlet 80) was found to operate well in separation system 10. In general, any upward flow of particles from collecting baffle 60 was deflected downward (as represented by the dashed lines of FIG. 2B) back into collecting baffle 60, while essentially particle-free or clean liquid flow was oriented toward axis A of lower section 20 and to inlet 110 of clean liquid conduit 100.

In several representative embodiments, vanes 42 of impeller 40 had a diameter just slightly less than the inner diameter of lower section housing 20, which had an inner diameter of 8.75 inches. As describe above, gap 46 was approximately 0.125 inches. Particle-laden coolant liquid was fed to inlet 30 at a flow rate of approximately 30 gallons/minute. The rotational speed of impeller 40 was varied between 1000 rpm and 3500 rpm. Lower section 20 in these embodiments was approximately 2 to 3 feet in length.

System 10, via impeller 40 imparts a significant downward force to the liquid and the particles therein that enhances separation efficiency as compared to, for example, the system of U.S. Pat. No. 7,520,997. In the embodiment illustrated in FIGS. 1A through 3, impeller vanes 42 extend to nearly the inner diameter of lower section housing 22, which is approximately equal to the maximum inner diameter of impeller cavity or seating 36. Vanes 42 in conjunction with upper section 30, which functions as an impeller housing or impeller case and may, for example, increase in diameter as it extends axially downward to approximately the inner diameter of lower section housing 22, direct the flow downward. Rotation of the liquid induced by impeller 40 (as compared to the impeller of U.S. Pat. No. 7,520,997) and downward force thereon is increased as a result of a larger impeller vane diameter and lack of any significant gap between impeller vanes 42 and cavity 36. Pressurizing of the liquid via impeller 40 was found not to negatively affect a desired laminar flow characteristic in lower section 20. Indeed, although approximately same volume of liquid may flow down the inner wall of lower section housing 22 as in the system of U.S. Pat. No. 7,520,997, the flow is more laminar in nature, resulting in less turbulence on the inner wall. The lower turbulence allows the particles to travel with fewer disturbances to the bottom of system 10 for collection. Smaller particles are removed in the same sized device/system. Alternatively, a similar or the same effective rate of particle removal can be accomplished with a smaller device/system. The target rate of particle removal by size in the same or similarly sized system is improved by approximately 20%.

In a number of embodiments, transitions in upper section 20 are gradual to limit non-laminar flow characteristics such as eddies and vortices. In that regard, the flow of liquid around generally horizontally oriented impeller vanes 42 transitions to a vertical flow down the inside surface of 20. In a number of embodiments, the surface of cavity 36 is curved such that the radius thereof gradually increases upon travelling in the axially downward direction until that radius reaches approximately the same or the same radius as the inner wall of lower section housing 22. Impeller vanes 42 are similarly curved. Moreover, the outer edge of restrictor 48 may also form a curved surface wherein the radius thereof gradually increases upon travelling in the axially downward direction.

U.S. Pat. No. 7,520,997 includes an impeller attached to a hollow impeller shaft via which clean liquid exits that system. That configuration is mechanically complex, requiring chambers, couplers and large seals and resulting in increased expense and a relatively short seal life. Further, that configuration limits the size of the passage through the impeller shaft. Further, the outlet passages in the upper section of the shaft created friction and reduced flow. The orientation of the inlet to the hollow impeller shaft of the system of U.S. Pat. No. 7,520,997 faces the bottom of the system, allowing an easier physical path for the particles to undesirably exit the system.

System 10 eliminates the need for a hollow rotating shaft. Because the shaft need not transport clean liquid out of the system, the diameter of the motor shaft that attaches to impeller 40 need be only as large as required by mechanical stresses require. For example, a 1.5 inch diameter hollow shaft used in the system of U.S. Pat. No. 7,520,997 may be reduced to 0.625 inch diameter shaft in system 20. Stationary (non-rotating) outlet conduit 100, through which the clean liquid exits system 10, does not have a practical size limitation so that friction can be reduced or minimized, resulting in energy savings. Further, inlet 110 of outlet conduit 100 may be oriented upward so that the particles have a more difficult path to exit system 10 via outlet conduit 100 (as compared to the rotating, hollow shaft of the system of U.S. Pat. No. 7,520,997), thereby increasing efficiency.

As described above, impeller 40 creates its own pressure and suction so that it is self-priming. Vane 42 rotating within impeller cavity 36 causes the fluid to be forced radially outward and downward through gap 46 between restrictor 48 and the inner diameter of the housing, thereby eliminating the need for a motor, pump, and all of the accompanying electrical control devices required to deliver fluid and create pressure in the system of U.S. Pat. No. 7,520,997. One embodiment of a system of U.S. Pat. No. 7,520,997 required a 1 horsepower (hp) pump to provide the pressure that caused the liquid to flow through the housing thereof, around the impeller thereof, and out through the hollow shaft thereof. The impeller of that system required a 5 hp motor. System 10 significantly reduces in energy use. In that regard, system 10 may accomplish the same task as the above-described embodiment of the system of U.S. Pat. No. 7,520,997 with a single 3 hp motor 140 rather than a 5 hp motor and a 1 hp motor, resulting in a 50% reduction in energy use. The energy use reduction arises, at least in part, from increased efficiency as a result of the elimination of restrictions in outlet size and the reduction in fluid turbulence as compared to the system of U.S. Pat. No. 7,520,997.

The particle-rich slurry exiting outlet 80 from particle settling/collecting baffle 60 may, for example, be transported (for example, pumped) to a settling separation system. Solenoid valve 90 of separation system 10 (see, for example, FIG. 1A) may, for example, be opened only long enough to displace clean decanted liquid from a settling tank through an outlet of the settling tank.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A system for separating a heavy fraction from a liquid, comprising:
    an upper section, an inlet in fluid connection with the upper section to introduce the liquid into the upper section, an impeller within the upper section to induce rotational flow and fluid pressure to the liquid within the upper section, a flow restrictor positioned below the impeller, the flow restrictor having a diameter less than an inner diameter of a wall of a housing of a lower section so that a gap is formed between the flow restrictor and the housing of the lower section, wherein there are no rotating elements below the flow restrictor, a conduit comprising an inlet positioned radially inward from an interior surface of the wall of the housing of the lower section and axially below the flow restrictor, the lower section being generally cylindrical from a top of the gap to a baffle positioned axially below the flow restrictor, the baffle defining a settling section for the heavy fraction, the lower section further comprising a slurry outlet in operative communication with the settling section via which a slurry with an increased concentration of the heavy fraction exits the lower section and a deflector positioned within the lower section axially above the baffle and below the flow restrictor, the deflector having a diameter less than the inner diameter of the wall of the housing of the lower section, the conduit extending through an opening in the deflector and through the wall of the housing of the lower section, the conduit further comprising an outlet outside of the lower section via which the liquid exits the lower section.

2. The system of claim 1 wherein the conduit passes generally through the center of the deflector.

3. The system of claim 1 wherein the impeller comprises radially extending vanes in operative connection with a rotating shaft.

4. The system of claim 3 wherein the flow restrictor is a plate positioned below and rotating with the vanes of the impeller.

5. The system of claim 4 wherein the upper section comprises a cavity within which the impeller rotates, wherein dimensions of the cavity are slightly greater than the dimensions of the vanes.

6. The system of claim 4 wherein the vanes impart rotation and downward force to the liquid.

7. The system of claim 1 wherein the baffle includes stationary vanes that extend radially outward generally to the inner diameter of the housing of the lower section.

8. The system of claim 1 wherein the deflector operates to prevent at least a portion of the heavy fraction in the settling area from passing from the settling section to the inlet of the outlet conduit.

9. The system of claim 1 wherein the deflector operates to prevent at least a portion of liquid having a reduced concentration of heavy fraction from passing from a section of the lower section radially inward from the interior wall of the lower section into the settling section.

10. The system of claim 1 wherein the deflector has a generally concave shape and wherein the deflector is oriented so that a center of the deflector is downward from a concave surface of the deflector.

11. The system of claim 1 wherein there is no rotational flow mechanism to induce rotational flow in the lower section below the flow restrictor.

12. The system of claim 1 wherein the heavier fraction comprises solid particles.

13. The system of claim 1 wherein the system comprises no filter medium.

14. The system of claim 1 wherein the inlet of the conduit faces upward.

15. The system of claim 5 wherein a diameter of the cavity gradually increases in a curved shape in the axially downward direction until the diameter of the cavity is approximately the same as the inner diameter of the housing of the lower section.

16. The system of claim 1 wherein a diameter of the flow restrictor gradually increases in a curved shape in an axially downward direction.

17. A system for separating a heavier fraction from a liquid, comprising:
    an upper section;
    an inlet in fluid connection with the upper section to introduce the liquid into the upper section;

a rotational flow mechanism positioned below the inlet in operative connection with the upper section to induce rotational flow and fluid pressure within the upper section;

a lower section in fluid connection with the upper section;

a flow restrictor positioned below the rotational flow mechanism, the flow restrictor having a diameter less than an inner diameter of a housing of the lower section so that a gap is formed between the flow restrictor and the housing of the lower section, wherein there are no rotating elements below the flow restrictor;

a conduit positioned within the lower section, the conduit comprising an inlet positioned radially inward from an interior surface of the wall of the housing of the lower section and axially below the flow restrictor;

at least one baffle positioned adjacent a bottom of the housing to reduce rotation in flow within the lower section in the area of the baffle, the baffle defining a settling section for the heavier fraction, the lower section being generally cylindrical from a top of the gap to the baffle, a deflector positioned within the lower section axially above the baffle and below the flow restrictor, the deflector having a diameter less than the inner diameter of the wall of the housing of the lower section, the conduit extending through an opening in the deflector and through the wall of the housing of the lower section, the conduit further comprising an outlet outside of the lower section via which the liquid exits the lower section; and a slurry outlet in operative communication with the settling section via which a slurry with an increased concentration of the heavy fraction exits the lower section.

18. The system of claim 17 wherein the conduit passes generally through the center of the deflector.

19. The system of claim 17 wherein the rotational flow mechanism is an impeller comprising radially extending vanes in operative connection with a rotating shaft.

20. The system of claim 17 wherein the flow restrictor is a plate below and rotating with the vanes of the impeller.

21. The system of claim 19 wherein the upper section comprises a cavity within which the impeller rotates, wherein dimensions of the cavity are slightly greater than the dimensions of the vanes.

22. The system of claim 19 wherein the vanes impart rotation and downward force to the liquid.

23. The system of claim 19 wherein the impeller is in operative connection with a rotating shaft.

24. The system of claim 17 wherein the baffle comprises stationary vanes that extend radially outward generally to the inner diameter of the housing of the lower section.

25. The system of claim 17 wherein the gap of the flow restrictor is dimensioned so that the rotational flow mechanism forces the liquid including the heavy fraction past the flow restrictor and through the gap to the lower section of the housing so that the liquid including the heavy fraction moves around and downward along the interior surface of the wall of the housing, thereby forcing the heavy fraction to move radially outward toward the interior surface of the wall of the housing as a result of centrifugal force.

26. The system of claim 17 wherein the deflector operates to prevent at least a portion of the heavier fraction in the settling section from passing from the settling section to the outlet.

27. The system of claim 17 wherein the deflector operates to prevent at least a portion of liquid having a reduced concentration of heavy fraction from passing from a section of the lower section radially inward from an interior wall of the lower section into the settling section.

28. The system of claim 17 wherein the deflector has a generally concave shape and wherein the concave deflector is oriented so that the center of the concave deflector is downward from a concave surface of the concave deflector.

29. The system of claim 17 wherein the heavier fraction comprises solid particles.

30. The system of claim 17 wherein the system comprises no filter medium.

31. The system of claim 17 wherein the inlet of the conduit faces upward.

32. The system of claim 21 wherein a diameter of the cavity gradually increases in a curved shape in an axially downward direction until the diameter of the cavity is approximately the same as the inner diameter of the housing of the lower section.

33. The system of claim 17 wherein a diameter of the flow restrictor gradually increases in a curved shape in the axially downward direction.

* * * * *